Figure 1:
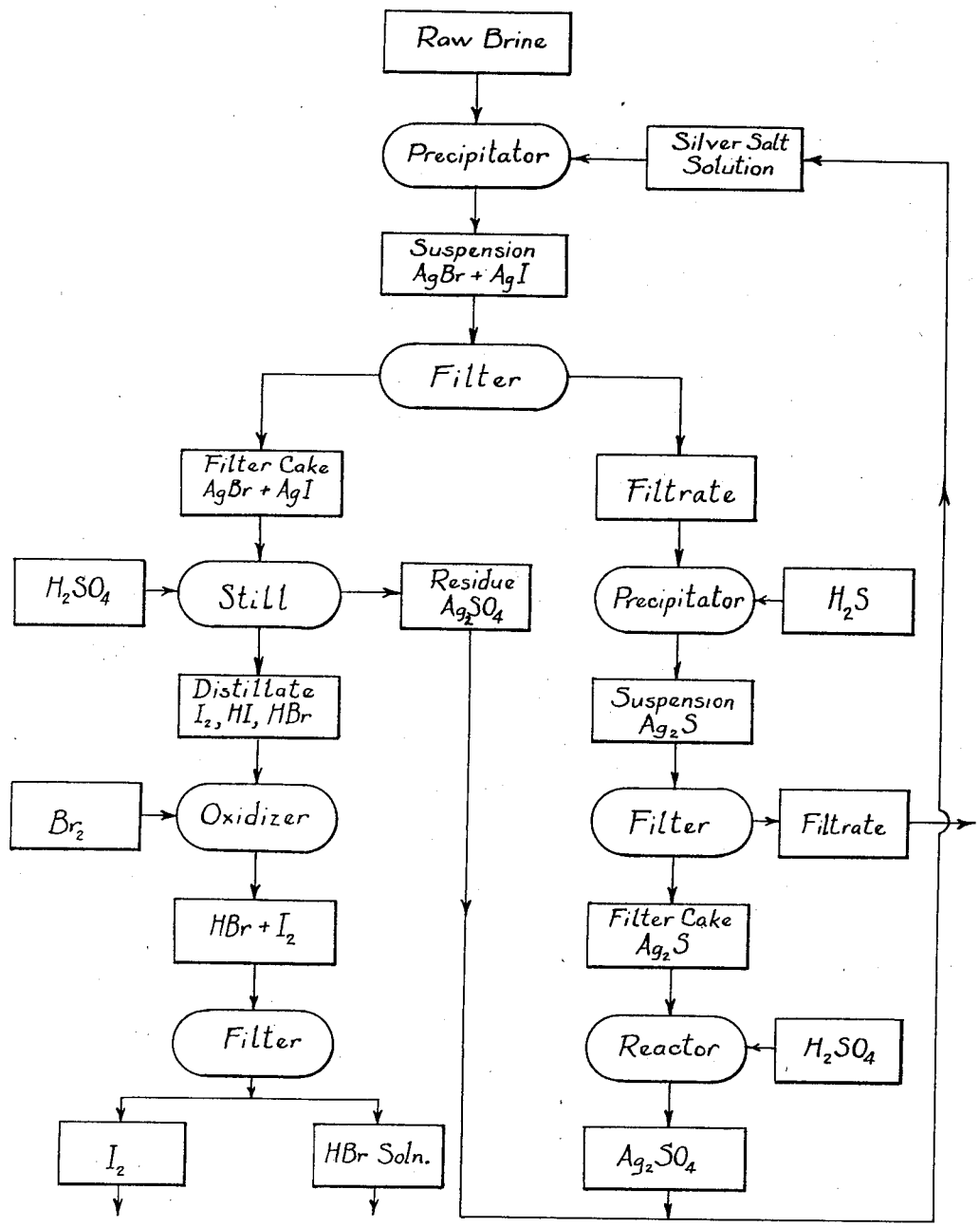

Sept. 19, 1933.  C. W. JONES  1,927,663

METHOD OF RECOVERING BROMINE AND IODINE CONJOINTLY

Filed Nov. 23, 1931

INVENTOR
Coulter W. Jones
BY Thomas Griswold, Jr.
ATTORNEY

Patented Sept. 19, 1933

1,927,663

UNITED STATES PATENT OFFICE 1,927,663

METHOD OF RECOVERING BROMINE AND IODINE CONJOINTLY

Coulter W. Jones, Shreveport, La., assignor to Jones Chemical Company, Inc., McDade, La., a corporation of Louisiana Application November 23, 1931
Serial No. 576,768

13 Claims. (Cl. 23—217)

This invention relates to methods for recovering bromine and iodine from mineral waters and mother liquors in which normally such halogens are present in combined form in exceedingly small amount.

In a prior application, Serial No. 321,367, filed November 23, 1928, now Patent 1,837,777 I have described a method of recovering iodine from mineral waters and the like wherein the same is precipitated in the form of the insoluble silver iodide which is separated from the aqueous medium and worked up for the production of iodine or commercial iodine compounds. The aforesaid method is capable of recovering iodine when present in as small amount as 5 parts per million, and without appreciable silver losses in the waste liquors.

The naturally occurring iodiferous brines are likewise known to contain bromine as well, and usually in amount considerably exceeding that of the iodine. The usual method of extracting bromine from such brines consists in chlorinating or otherwise oxidizing the brine to liberate the bromine in the elemental state, whereupon the bromine is removed as vapor by steaming or blowing out with air and the vapors are recovered in known manner by absorption in a suitable medium, such as an alkali or active charcoal. A somewhat similar procedure has been developed for the recovery of iodine alone, as more particularly described in a patent application of myself and J. J. Grebe, Serial No. 388,622, filed August 26, 1929 now Patent 1,-853,621. However, it is not practicable to recover both iodine and bromine together in a process wherein the bromine is liberated in the elemental state by oxidation, since the liberation of the bromine is accompanied by the oxidation of the iodine to the non-volatile iodate which is readily soluble in water. Accordingly, mineral waters and the like from which bromine has been extracted by vaporization cannot be worked simultaneously for the recovery of iodine by vaporizing as free iodine, nor subsequently on a profitable commercial scale for recovery of iodine by precipitation with a silver salt because of the considerably greater solubility of silver iodate as compared with the iodide. With the extremely small amounts of iodine actually present in such cases no satisfactory method of reducing the highly stable iodate to free iodine or to iodide is available which is capable of giving a good recovery at a suitable cost.

The direct precipitation of both bromine and iodine together from the brine as the silver salts has not been considered feasible owing to the appreciable solubility of silver bromide as compared with the iodide, particularly in brines of fairly high salt content. While silver bromide is a relatively insoluble compound, it is sufficiently soluble that the percentage loss of silver compound in recovering bromine in this way from usual sources, such as mineral waters or mother liquors, is too great to permit profitable operation at normal prices for silver. I have found, however, that losses of silver dissolved in the waste liquor from the precipitation of the combined silver halides may be reduced to a practically negligible amount by treating the liquor with a reagent capable of producing a more insoluble compound than silver bromide, separating the precipitate so formed and recovering the silver therefrom. As suitable reagents I may use a metallic iodide or sulphide more soluble in water than silver iodide or sulphide. The invention, then, consists in the steps hereinafter fully described and particularly pointed out in the claims, the annexed drawing and following description setting forth but a few of the various ways in which the principle of the invention may be used.

In said drawing:—

The single figure is a flow sheet showing the sequence of steps and movement of materials in one preferred embodiment of the invention.

My improved method will be described illustratively, as applied to the recovery of bromine and iodine conjointly from a natural brine having approximately the composition as shown by the following analysis:—

| | |
|---|---|
| Specific gravity | 1.036 |
| NaCl | 4.87 per cent |
| $MgCl_2$ | 0.41 per cent |
| $CaCl_2$ | 0.26 per cent |
| Fe | 0.01 per cent |
| $Br_2$ | 0.02 per cent |
| $I_2$ | 0.004 per cent |
| Alkalinity | 0.012 N |

The method, however, may be applied generally for the treatment of natural brines and mother liquors containing both bromine and iodine in widely varying proportions and amounts, and the specific example herein described in detail is not to be regarded as a limitation upon the invention.

Referring to the drawing as illustrating the consecutive steps comprising one embodiment of my improved method, the raw brine is introduced into a suitable apparatus wherein it is mixed, preferably with agitation, with a solution or suspension of a relatively soluble silver salt, e.g. silver sulphate or nitrate. Silver chloride, which is less insoluble than the bromide, may also be used, although with the latter more agitation and a longer reaction time will be required than in the case of a more soluble reagent. A precipitate of silver bromide and silver iodide is formed, the soluble silver salt being added preferably in amount to avoid any substantial excess thereof. The precipitated silver halides are then filtered through any convenient type of filter, for which operation it may be advantageous to use a filter aid, such as fuller's earth, Filter-cel, etc., owing to the fine state of subdivision of the precipitate as initially formed.

The filtrate contains a small amount of silver compounds in solution or colloidal suspension, in the case of the above brine amounting to about 8–10 milligrams per liter in my experience. Such filtrate is treated for the recovery of the silver by reacting with hydrogen sulphide or a suitable sulphide such as sodium sulphide, for instance by introducing hydrogen sulphide gas in slight excess. A precipitate of silver sulphide is thereby formed, which is filtered from the aqueous solution. The latter is substantially free from silver compounds in detectable amount and may be run to waste. The precipitate of silver sulphide may be converted to a soluble silver salt by treatment with a strong mineral acid, e.g. sulphuric acid or nitric acid, and the silver salt solution may be returned to the first step for treating the raw brine.

The precipitate of silver bromide and silver iodide is treated with a reagent capable of decomposing the silver compounds, so as to separate the halogens and to reconstitute a silver salt suitable for use in treating a further quantity of raw brine. This may be done by chlorinating, or more advantageously by distilling with sulphuric acid, in which latter case the halogens are distilled off as hydrogen halide together with more or less free iodine, leaving a residue containing silver sulphate. Such residue may be combined with the silver compound recovered from the original filtrate and returned to the first step. The distillate consisting of a mixture of iodine, hydriodic acid and hydrobromic acid may be absorbed in water. In order to effect a separation of the two halogens in this distillate it may be oxidized to convert the hydriodic acid present to free iodine, and then filtered to separate the total iodine from the aqueous hydrobromic acid solution. As a suitable oxidizing agent bromine or ferric bromide may be employed. The iodine so recovered may be purified in the usual way to make a marketable product, while the hydrobromic acid solution may be worked up by known methods for the preparation of commercial bromides or free bromine.

Working in this way with a raw brine having the analysis given above, I am able to recover 90 per cent or more of the iodine and bromine originally present therein, and, moreover, to reduce silver losses to a practically negligible figure. The method is further advantageous in that it requires no acidification of the raw brine.

Instead of treating the original filtrate with hydrogen sulphide or a soluble sulphide, as described, I may use a soluble iodide, e.g. an alkalimetal iodide, which is to be added in amount corresponding closely to the silver content of the filtrate. Such iodide may be supplied as a solution thereof or a sufficient amount of raw brine to furnish the requisite iodide may be used. The precipitate of silver iodide formed may be filtered off and further processed to recover iodine and silver separately, or more conveniently may be added to the main precipitate of silver bromide and silver iodide to be worked up for the separation of the two halogens and silver in accordance with the procedure as already set forth.

The separation of the precipitate of silver bromide and iodide in the first instance, or of silver sulphide or iodide in the later step, from the aqueous solution or liquor may be effected by any suitable procedure. Instead of filtration, sedimentation and decantation or centrifugal separation may be utilized. Heating and subsequent cooling of the suspension may be resorted to, if desired, to coagulate the precipitate prior to its separation from the solution, in which case heat exchange may be employed to conserve the heat of the solution and reduce heat requirement for the operation.

In certain of the claims the term "soluble sulphide" is understood to include hydrogen sulphide as well as water soluble metallic sulphides.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of recovering bromine and iodine conjointly from mineral waters and the like containing the same in relatively small amount as bromide and iodide, respectively, which comprises adding thereto a silver salt more soluble in water than silver bromide preferably in amount chemically equivalent to such bromide and iodide, separating the resulting precipitate of silver bromide and silver iodide from the aqueous solution, treating the precipitate to separate the halogens from the silver therein and recovering residual silver from said aqueous solution by precipitation as an insoluble silver compound.

2. The method of recovering bromine and iodine conjointly from mineral waters and the like containing the same as bromide and iodide, respectively, which comprises adding thereto a silver salt more soluble in water than silver bromide preferably in amount chemically equivalent to such bromide and iodide, separating the resulting precipitate of silver bromide and silver iodide from the aqueous solution, treating the latter with a reagent from the class consisting of soluble iodides and sulphides to precipitate residual silver therein as an insoluble silver compound and separating the precipitate.

3. The method of recovering bromine and iodine conjointly from mineral waters and the like containing the same as bromide and iodide, respectively, which comprises adding thereto a silver salt more soluble in water than silver bromide preferably in amount chemically equivalent to such bromide and iodide, separating the resulting precipitate of silver bromide and silver iodide from the aqueous solution, treating the precipitate to liberate the halogens therefrom and to recover the silver in combined form reactable in said first step, treating said aqueous solution with a soluble sulphide to precipitate residual silver therein as sulphide and separating the precipitate.

4. The method of recovering bromine and iodine conjointly from mineral waters and the like containing the same as bromide and iodide, respectively, which comprises adding thereto a silver salt more soluble in water than silver bromide preferably in amount chemically equivalent to such bromide and iodide, separating the resulting precipitate of silver bromide and silver iodide from the aqueous solution, reacting said precipitate with sulphuric acid to convert the halogen constituents thereof to free halogen or hydrogen halide and the silver constituent to silver sulphate, separating the latter from the halogen compounds, treating said aqueous solution with a soluble sulphide to precipitate residual silver therein as sulphide, separating the precipitate and converting the same to a silver compound reactable in said first step.

5. The method of recovering bromine and iodine conjointly from mineral waters and the like containing the same as bromide and iodide, respectively, which comprises adding thereto a silver salt more soluble in water than silver bromide preferably in amount chemically equivalent to such bromide and iodide, separating the resulting precipitate of silver bromide and silver iodide from the aqueous solution, reacting said precipitate with sulphuric acid to convert the halogen constituent thereof to free halogen or hydrogen halide and the silver constituent to silver sulphate, separating the latter from the halogen compounds, oxidizing such compounds to convert the iodine component thereof to free iodine while the bromine component remains as hydrogen bromide, separating the iodine from the hydrogen bromide; treating said aqueous solution with hydrogen sulphide to precipitate residual silver therein as sulphide, separating the precipitate and converting the same to a silver compound reactable in said first step.

6. The method of recovering bromine and iodine conjointly from mineral waters and the like containing the same as bromide and iodide, respectively, which comprises adding silver sulphate thereto, in amount substantially chemically equivalent to such bromide and iodide, separating the resulting precipitate of silver bromide and silver iodide from the aqueous solution, reacting said precipitate with sulphuric acid to convert the halogen constituent thereof to free halogen or hydrogen halide and the silver constituent to silver sulphate, separating the latter from the halogen compounds, oxidizing such compounds to convert the iodine component thereof to free iodine while the bromine component remains as hydrogen bromide, separating the iodine from the hydrogen bromide; treating said aqueous solution with hydrogen sulphide to precipitate residual silver therein as sulphide, separating the precipitate, converting the same to sulphate by reacting with sulphric acid, and returning the silver sulphate recovered from the aforesaid treatment of the original precipitate and filtrate, respectively, to the first step.

7. In a method of recovering bromine and iodine conjointly from mineral waters and the like containing the same as bromide and iodide, wherein said halogens are precipitated as the corresponding silver halides and separated from the aqueous solution, the step which consists in treating said solution with a reagent from the class consisting of soluble iodides and sulphides to precipitate residual silver therein as an insoluble silver compound.

8. In a method of recovering bromine and iodine conjointly from mineral waters and the like containing the same as bromide and iodide, respectively, the steps which consist in precipitating said halogens together as the corresponding silver halides, distilling the precipitate with sulphuric acid, whereby the halogens are obtained in the distillate leaving a residue of silver sulphate.

9. In a method of recovering bromine and iodine conjointly from mineral waters and the like containing the same as bromide and iodide, respectively, the steps which consist in precipitating said halogens together as the corresponding silver halides, distilling the precipitate with sulphuric acid, whereby the halogens are obtained in the distillate leaving a residue of silver sulphate, oxidizing such distillate sufficiently to convert the iodine constituent thereof to free iodine and separating such free iodine from the accompanying hydrogen bromide.

10. In a method of recovering bromine and iodine conjointly from mineral waters and the like, wherein said halogens are precipitated together as the corresponding silver halides, the step which consists in treating such precipitate of silver bromide and silver iodide with a chemical reagent capable of decomposing the same to form free halogen or volatile halogen compounds and leave a non-volatile silver compound.

11. In a method of recovering bromine and iodine conjointly from mineral waters and the like, wherein said halogens are precipitated together as the corresponding silver halides, the steps which consist in reacting such precipitate of silver bromide and silver iodide with sulphuric acid and distilling off the halogens as a mixture of hydrogen bromide, hydrogen iodide and free iodine from the non-volatile residue of silver sulphate.

12. In a method of recovering bromine and iodine conjointly from mineral waters and the like, wherein said halogens are precipitated together as the corresponding silver halides, the steps which consist in reacting such precipitate of silver bromide and silver iodide with sulphuric acid, distilling off the halogens as a mixture of hydrogen bromide, hydrogen iodide and free iodine from the non-volatile residue of silver sulphate, oxidizing the hydrogen iodide component of the distillate to free iodine, and separating the free iodine from the hydrogen bromide.

13. In a method of extracting bromine and iodine conjointly from aqueous solutions containing the same as bromide and iodide, respectively, the steps which consist in converting said bromide and iodide to the corresponding insoluble silver salts, separating the latter from the solution and recovering residual silver from said solution by precipitating as an insoluble silver sulphide.

COULTER W. JONES.